S. NAVROT.
FLY TRAP.
APPLICATION FILED OCT. 17, 1918.
1,297,894.
Patented Mar. 18, 1919.
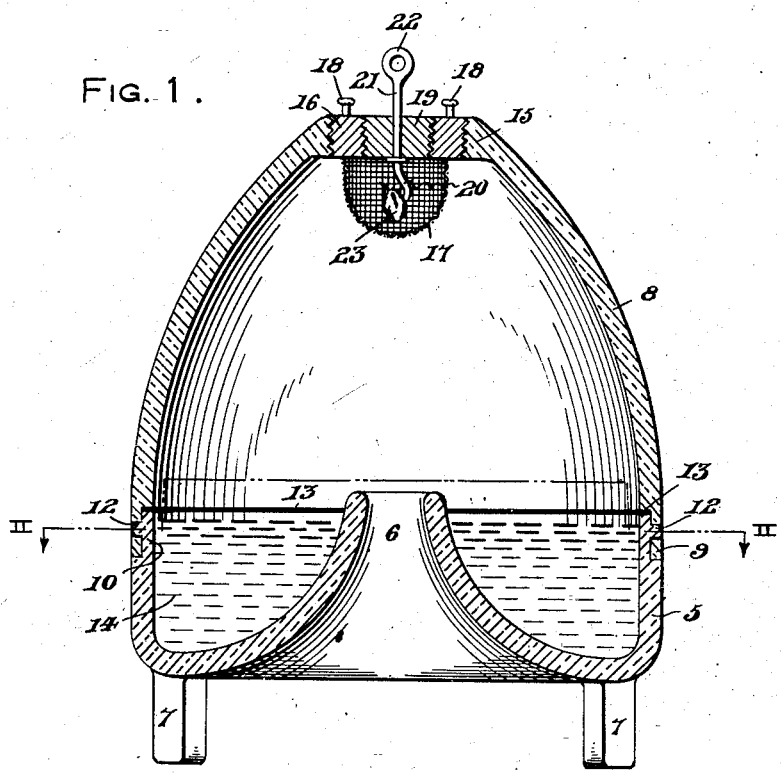
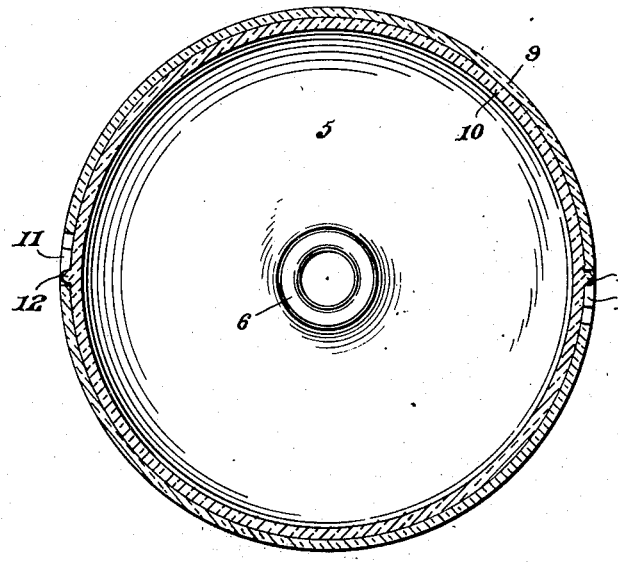
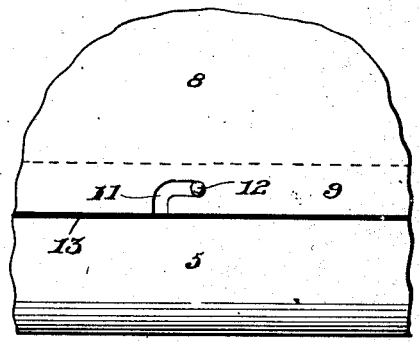
Inventor
S. Navrot
By A. M. Wilson,
Attorney

UNITED STATES PATENT OFFICE.

STANLEY NAVROT, OF HEILWOOD, PENNSYLVANIA.

FLY-TRAP.

1,297,894.   Specification of Letters Patent.   Patented Mar. 18, 1919.

Application filed October 17, 1918. Serial No. 258,610.

*To all whom it may concern:*

Be it known that I, STANLEY NAVROT, a citizen of Russia, residing at Heilwood, in the county of Indiana and State of Pennsylvania, have invented certain new and useful Improvements in Fly-Traps, of which the following is a specification.

This invention relates to certain new and useful improvements in fly traps and has among its principal objects the provision of this type of device which is extremely effective in operation, simple in construction and capable of being easily cleaned.

A still further object of the invention is the provision of a fly trap which is adapted to be placed upon a suitable support such as a table or suspended from a ceiling or the like, as desired, the suspension means also constituting a bait holder which is removable from the trap and detachably carried by a removable bushing supporting a protecting screen for the bait.

With the above general objects in view and others that will become apparent as the nature of the invention is better understood, the same consists in the novel form, combination, and arrangement of parts hereinafter more fully described, shown in the accompanying drawing, and claimed.

In the drawing, wherein like characters of reference indicate corresponding parts throughout the several views, Figure 1 is a central vertical sectional view of a fly trap constructed in accordance with the present invention.

Fig. 2 is a horizontal sectional view of the device shown in Fig. 1 taken substantially upon line II—II of Fig. 1, and Fig. 3 is a fragmentary detail view illustrating the detachable connection between the upper and lower sections of the trap.

Referring more in detail to the several views, the present invention embodies a lower or base member 5 of somewhat annular trough-shaped formation having an inwardly extending substantially central hollow frusto-conical entrance member 6 and depending supporting lugs 7 as is usual in this class of invention.

An inverted substantially cup-shaped upper member 8 is provided for the trap which is reduced in width at its lower end 9 to snugly surround the reduced upper portion 10 of the base member 5 and at diametrically opposite points, said cup-shaped member 8 is provided with bayonet slots 11 at its lower edge in which engage the outwardly projecting pins 12 which are rigidly carried by the reduced portion 10 of the base member 5 in order to detachably connect the members 5 and 8 when in their operative relation as shown in Fig. 1. A suitable gasket 13 may be interposed between the members 5 and 8 in order to provide a fluid-tight joint so that the poisonous liquid 14 may not readily escape from the base member 5 in case the trap should be jarred, it being noted that such liquid is usually used to exterminate the flies when caught in the trap.

The top 15 of the cup-shaped member 8 is provided with a central circular aperture surrounded by a threaded wall into which is screwed a threaded bushing 16 which has a cage-like screen 17 connected thereto in any suitable manner so as to depend from the underface thereof within the member 8. Suitable knobs 18 are carried by the bushing 16 and extend from the upper face of the latter in order that the same may be screwed into or out of the aperture in the top 15 of the member 8.

The bushing 16 is provided with internal threads and is adapted to have a suitable plug or closure 19 screwed into the same, while a bait holding hook 20 is suitably rigidly secured in the plug 19 so as to depend from the latter and assume a position within the cage 17 when operatively disposed. The bait holding hook 20 has a shank 21 which extends through the plug 19 and is provided with an eye 22 at its upper end to which may be connected a chain or the like by means of which the trap may be suspended from a ceiling or other suitable support. When the trap is suspended, the interlocking connection 11 and 12 maintains the members 5 and 8 connected, but when the trap is supported upon a table or the like by means of the legs 7, this interlocking connection is not necessarily utilized.

In operation, the base member 5 is filled with suitable poisonous liquid 14 and the inverted cup-shaped member 8 is then placed in position. The bushing 16 is then screwed into place and a suitable bait 23 is placed upon the hook 20, after which the plug 19 is screwed into position within the bushing 16. The bait 23 will be scented by the flies which, in an endeavor to reach the bait 23 will enter the entrance member 6 and light upon the cage 17. This cage is utilized to prevent the flies from gaining access to the bait and thereby considerably reducing the number of times necessary to renew the latter. In renewing the bait 23, the plug 19 may be readily removed for this purpose and should the cage 17 become unclean, the bushing 16 may be removed in order to clean the cage.

From the foregoing description, it is believed that the construction and operation of the present invention will be readily understood by those skilled in the art, and while the form of the invention herein shown and described is what is believed to be the preferable embodiment thereof, it is nevertheless to be understood that minor changes may be made in the form, combination and arrangement of parts without departing from the spirit and scope of the invention as claimed.

What I claim as new is:—

1. A fly trap including in combination with a base member in the form of an annular trough provided with an inwardly extending central entrance member, an inverted cup-shaped member detachably connected thereto having a central circular opening in the top thereof, a bushing removably secured within said opening, a depending cage rigidly suspended from said bushing, a plug removably positioned within said bushing, and a bait holding means carried by said plug arranged for reception within said cage when operatively disposed.

2. A fly trap comprising in combination with a base member in the form of an annular trough having an inwardly extending central entrance member, an inverted cup-shaped member detachably mounted on said base member and provided with an opening therethrough, a removable bushing positioned in said opening, a cage carried by said bushing projecting within said cup-shaped member, and a plug removably secured in said bushing and provided with a bait holding means arranged for reception within said cage when operatively disposed.

3. A fly trap comprising in combination with a base member in the form of an annular trough provided with an inwardly extending central entrance member, an inverted cup-shaped member mounted on said base member, interlocking connections between said base member and said cup-shaped member, said cup-shaped member being provided with a central opening in the top thereof, a bushing removably secured in said opening and provided with a depending cage, a plug removably secured in said bushing, and suspending means for said trap carried by said plug including a bait holding hook arranged for reception within said cage when operatively disposed.

In testimony whereof I affix my signature.

STANLEY NAVROT.